US008923515B2

(12) United States Patent
McCann

(10) Patent No.: US 8,923,515 B2
(45) Date of Patent: Dec. 30, 2014

(54) SYSTEM AND METHOD FOR MOBILITY MANAGEMENT IN A COMMUNICATIONS SYSTEM

(75) Inventor: Peter J. McCann, Somerset, NJ (US)

(73) Assignee: Futurewei Technologies, Inc., Plano, TX (US)

(*) Notice: Subject to any disclaimer, the term of this patent is extended or adjusted under 35 U.S.C. 154(b) by 200 days.

(21) Appl. No.: 13/468,887

(22) Filed: May 10, 2012

(65) Prior Publication Data
US 2012/0288095 A1 Nov. 15, 2012

Related U.S. Application Data

(60) Provisional application No. 61/485,541, filed on May 12, 2011, provisional application No. 61/605,633, filed on Mar. 1, 2012.

(51) Int. Cl.
H04L 29/06 (2006.01)
H04W 40/36 (2009.01)
H04W 36/10 (2009.01)

(52) U.S. Cl.
CPC .............. *H04W 40/36* (2013.01); *H04W 36/10* (2013.01)
USPC ........................................................ 380/270

(58) Field of Classification Search
USPC ........................................................ 380/270
See application file for complete search history.

(56) References Cited

U.S. PATENT DOCUMENTS

| 7,502,629 | B2 * | 3/2009 | Vanhatalo et al. | 455/558 |
| 7,881,468 | B2 * | 2/2011 | Haddad | 380/247 |
| 2004/0215957 | A1 * | 10/2004 | Moineau et al. | 713/153 |
| 2004/0221163 | A1 * | 11/2004 | Jorgensen et al. | 713/182 |
| 2004/0253983 | A1 * | 12/2004 | Vanhatalo et al. | 455/558 |
| 2005/0262343 | A1 * | 11/2005 | Jorgensen et al. | 713/168 |
| 2006/0072761 | A1 * | 4/2006 | Johnson et al. | 380/270 |
| 2006/0227971 | A1 * | 10/2006 | Haddad | 380/247 |
| 2007/0101142 | A1 * | 5/2007 | Suzuki | 713/171 |
| 2009/0187980 | A1 * | 7/2009 | Tung | 726/6 |
| 2010/0281250 | A1 * | 11/2010 | Moineau et al. | 713/151 |

FOREIGN PATENT DOCUMENTS

| CN | 101179457 A | 5/2008 |
| CN | 101378587 A | 3/2009 |
| CN | 102036220 A | 4/2011 |

OTHER PUBLICATIONS

Hu et al.; Ariadne: a secure on-demand routing protocol for ad hoc networks; Published in: Journal Wireless Networks archive; vol. 11 Issue 1-2, Jan. 2005; pp. 21-38; ACM Digital Library.*

(Continued)

*Primary Examiner* — Bradley Holder
(74) *Attorney, Agent, or Firm* — Slater & Matsil, L.L.P.

(57) ABSTRACT

A method for maintaining routing information for a wireless device includes determining, by a target communications controller, an original address of the wireless device handed over from a source communications controller, where the original address is assigned by an original communications controller. The method also includes updating, by the target communications controller, routing information associated with the wireless device using a border gateway protocol message if the original address lies within a range of addresses managed by a communications system including the target communications controller and an aggregation router, where the routing information is stored at the aggregation router.

15 Claims, 9 Drawing Sheets

(56) References Cited

OTHER PUBLICATIONS

Deng et al.; Threshold and identity-based key management and authentication for wireless ad hoc networks; Published in: Information Technology: Coding and Computing, 2004. Proceedings. ITCC 2004. International Conference on (vol. 1 ) Date of Conference: Apr. 5-7, 2004 pp. 107-111 vol. 1; EEE Xplore.*
"Written Opinion and International Search Report," International Application No. PCT/CN2012/075457, Applicant: Huawei Technologies Co., Ltd., mailing date: Aug. 23, 2012, 6 pages.
"Draft Standard for Information Technology—Telecommunications and information exchange between systems—Local and metropolitan area networks—Specific requirements—Part 11:Wireless LAN Medium Access Control (MAC) and Physical Layer (PHY) specifications," IEEE P802.11-REVma, 2006, 1228 pages.
Aboba, B., et al., "Extensible Authentication Protocol (EAP)," RFC 3748, Standards Track, Jun. 2004, 63 pages.
Barker, E., et al., "Recommendation for Pair-Wise Key Establishment Schemes Using Discrete Logarithm Cryptography," National Institute of Standards and Technology, Mar. 2007, 114 pages.
Bates, T., et al., "BGP Route Reflection—An Alternative to Full Mesh IBGP," RFC 2796, Standards Track, Apr. 2000, 12 pages.
Bernstein, D.J., "Speed reports for elliptic-curve cryptography," http://cr.yp.to/ecdh/reports.html, 2005, 4 pages.
Bradner, S., "Key words for use in RFCs to Indicate Requirement Levels," RFC 2119, Best Current Practice, Mar. 1997, 3 pages.
Campbell, A.T., et al., "Design, Implementation, and Evaluation of Cellular IP," IEEE Personal Communications, Aug. 2000, pp. 42-49.
Cooper, D., et al., "Internet X.509 Public Key Infrastructure Certificate and Certificate Revocation List (CRL) Profile," RFC 5280, Standards Track, May 2008, 152 pages.
Dierks, T., "The Transport Layer Security (TLS) Protocol Version 1.2," RFC 5246, Standards Track, Aug. 2008, 105 pages.
Dul, A.L., "Global IP Network Mobility using Border Gateway Protocol (BGP)," Mar. 2006, pp. 1-9.
Gaubatz, G., et al., "State of the Art in Ultra-Low Power Public Key Cryptography for Wireless Sensor Networks," 2nd IEEE International Workshop on Pervasive Computing and Communication Security, 2005, 5 pages.
Hoffman, P., et al., "Using Secure DNS to Associate Certificates with Domain Names for S/MIME draft-hoffman-dane-smime-01," Standards Track, Aug. 22, 2011, 6 pages.
Hoffman, P., et al., "Using Secure DNS to Associate Certificates with Domain Names for TLS draf-ietf-dane-protocol-16," Standards Track, Feb. 8, 2012, 27 pages.
Hu, X., et al., "Wide-Area IP Network Mobility," IEEE Infocom, 2008, 9 pages.
Kaufman, C. et al., "Internet Key Exchange Protocol Version 2 (IKEv2)," RFC 5996, Standards Track, Sep. 2010, 139 pages.
Liu, D., "Distributed Deployment of Mobile IPv6 draft-liu-mext-distributed-mobile-ip-00," MEXT Working Group, Mar. 7, 2011, 12 pages.
Myers, M., et al., "X.509 Internet Public Key Infrastructure Online Certificate Status Protocol—OCSP," RFC 2560, Standards Track, Jun. 1999, 24 pages.
Patrick, M., "DHCP Relay Agent Information Option," RFC 3046, Standards Track, Jan. 2001, 15 pages.
Ramjee, R. et al., "HAWAII: A Domain-based Approach for Supporting Mobility in Wide-area Wireless Networks," IEEE Conference on Network Protocols, Nov. 1999, 10 pages.
Rekhter, Y., et al., "A Border Gateway Protocol 4 (BGP-4)," RFC 4271, Standards Track, Jan. 2006, 105 pages.
Wouters, P. et al., "TLS out-of-band public key validation draft-wouters-tls-oob-pubkey-02," Standards Track, Nov. 17, 2011, 11 pages.

* cited by examiner

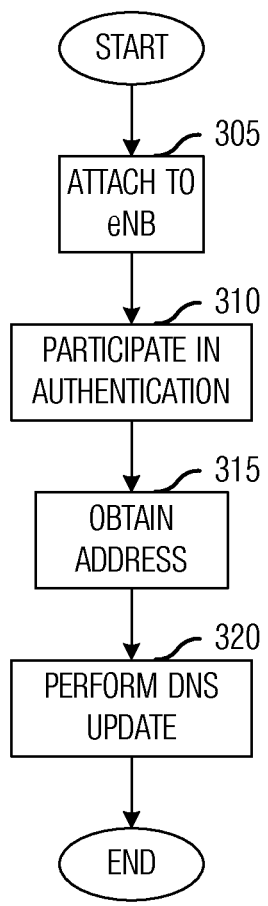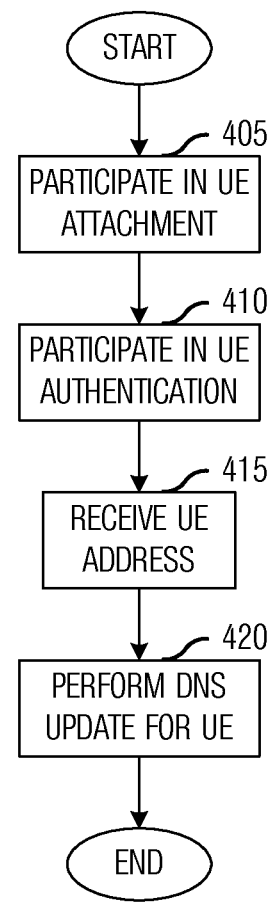
*Fig. 3*     *Fig. 4*

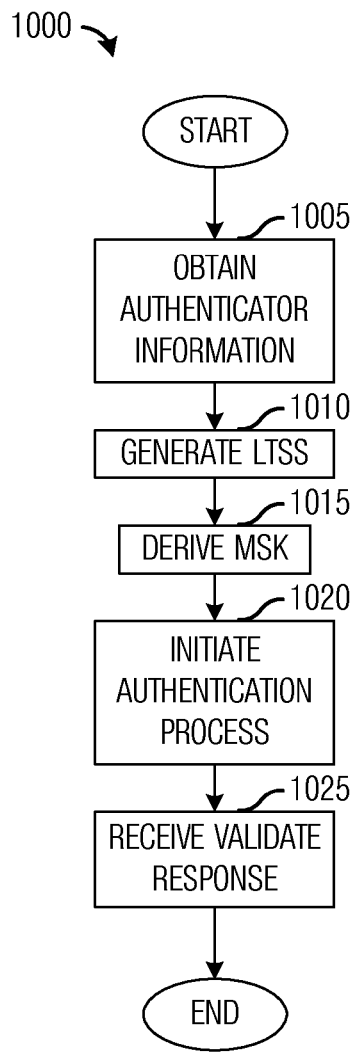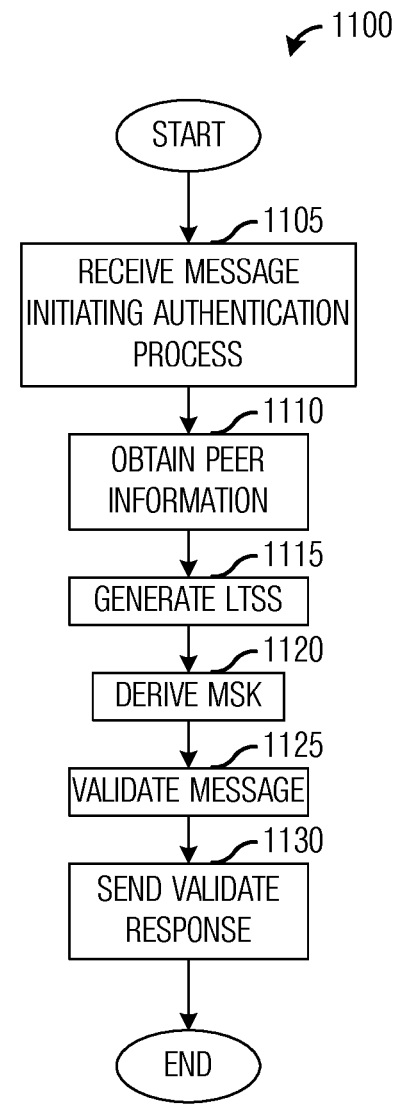
Fig. 10
Fig. 11

SYSTEM AND METHOD FOR MOBILITY MANAGEMENT IN A COMMUNICATIONS SYSTEM

This application claims the benefit of U.S. Provisional Application No. 61/485,541, filed on May 12, 2011, entitled "Wireless Internet Service Provider Network and Method," and No. 61/605,633, filed on Mar. 1, 2012, entitled "System and Method for Authentication and Mobility Management in a Flat Architecture," which applications are hereby incorporated herein by reference.

TECHNICAL FIELD

The present disclosure relates generally to digital communications, and more particularly to a system and method for mobility management in a communications system.

BACKGROUND

Wireless communications, such as provided by cellular communications systems, have permitted users to move freely without being encumbered with wires. Typically, as long as the users remain within an area where there is wireless service, they will be able to access desired services. However, since a coverage area of any one evolved NodeB (eNB), which may also be commonly referred to as a communications controller, a base station, a controller, a NodeB, and the like, is finite in size, a user may move outside of the coverage area of the eNB and need to change to another eNB in order to maintain service. A process wherein the user's device (commonly referred to as a user equipment (UE), a mobile, a mobile station, a subscriber, a terminal, and the like) changes from service provided by a first eNB to service provided by a second eNB is commonly referred to as a handover.

As the user moves around and participates in handover(s), maintaining routing information for the user to be used to route packets to the user may become difficult. Therefore, there is a need for a system and method for maintaining routing information for users that are reliable, scalable, and does penalize performance with a large amount of routing latency.

SUMMARY OF THE DISCLOSURE

Example embodiments of the present disclosure which provide a system and method for mobility management in a communications system.

In accordance with an example embodiment of the present disclosure, a method for maintaining routing information for a wireless device is provided. The method includes determining, by a target communications controller, an original address of the wireless device handed over from a source communications controller, where the original address is assigned by an original communications controller. The method also includes updating, by the target communications controller, routing information associated with the wireless device using a border gateway protocol message if the original address lies within a range of addresses managed by a communications system including the target communications controller and an aggregation router, where the routing information is stored at the aggregation router.

In accordance with an example embodiment of the present disclosure, a method for maintaining routing information for a wireless device is provided. The method includes receiving, by an aggregation router, an original address of the wireless device assigned by an original communications controller and an address of a target communications controller. The method also includes providing, by the aggregation router, the original address of the wireless device and the address of the target communications controller to local communications controllers using a first border gateway protocol message, where the local communications controllers are commonly served by the aggregation router.

In accordance with another example embodiment of the present disclosure, target communications controller is provided. The target communications controller includes a processor. The processor determines an original address of a wireless device handed over from a source communications controller, where the original address is assigned by an original communications controller, and updates routing information associated with the wireless device using a border gateway protocol message if the original address lies within a range of addresses managed by a communications system including the target communications controller and an aggregation router, where the routing information is stored at the aggregation router.

One advantage of an embodiment is that the example embodiments presented herein are potentially more reliable since there is not a single centralized entity that is responsible for maintaining updated routing information. Furthermore, the use of a distributed technique for maintaining updated routing information is more scalable.

A further advantage of an embodiment is that the latency incurred in routing in the example embodiments presented herein are proportional to a distance between a user's current location and where the user initially attached. Therefore, if the user remains close to where it initially attached, the latency is small.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 3 illustrates an example flow diagram of UE operations in obtaining an address according to example embodiments described herein;

FIG. 4 illustrates an example flow diagram of eNB operations in obtaining an address according to example embodiments described herein;

FIG. 10 illustrates an example flow diagram of operations occurring in a peer as it participates in an authentication process with an authenticator according to example embodiments described herein;

FIG. 11 illustrates an example flow diagram of operations occurring in an authenticator as it participates in an authentication process with a peer according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to mobility management in a communications system. For example, a target communications controller determines an original address of a wireless device that it has handed over from a source communications controller. The target communications controller also updates routing information for the wireless device stored at an aggregation router using a border gateway protocol message if the original address lies within a range of addresses managed by a communications system including the target communications controller and the aggregation router. For example, an aggregation router receives an original address of a wireless device assigned by an original communications controller as well as an address of a target communications controller. The aggregation router provides the original address of the wireless device and the address of the target communications controller using a border gateway protocol message to local communications controllers that are served by the aggregation router.

The present disclosure will be described with respect to example embodiments in a specific context, namely a Third Generation Partnership Project (3GPP) compliant communications system that makes use of border gateway protocol (BGP) messaging to provide routing information updates. The disclosure may also be applied, however, to other standards and non-standards compliant communications systems that make use of BGP messaging to provide routing information updates.

Figure 1:
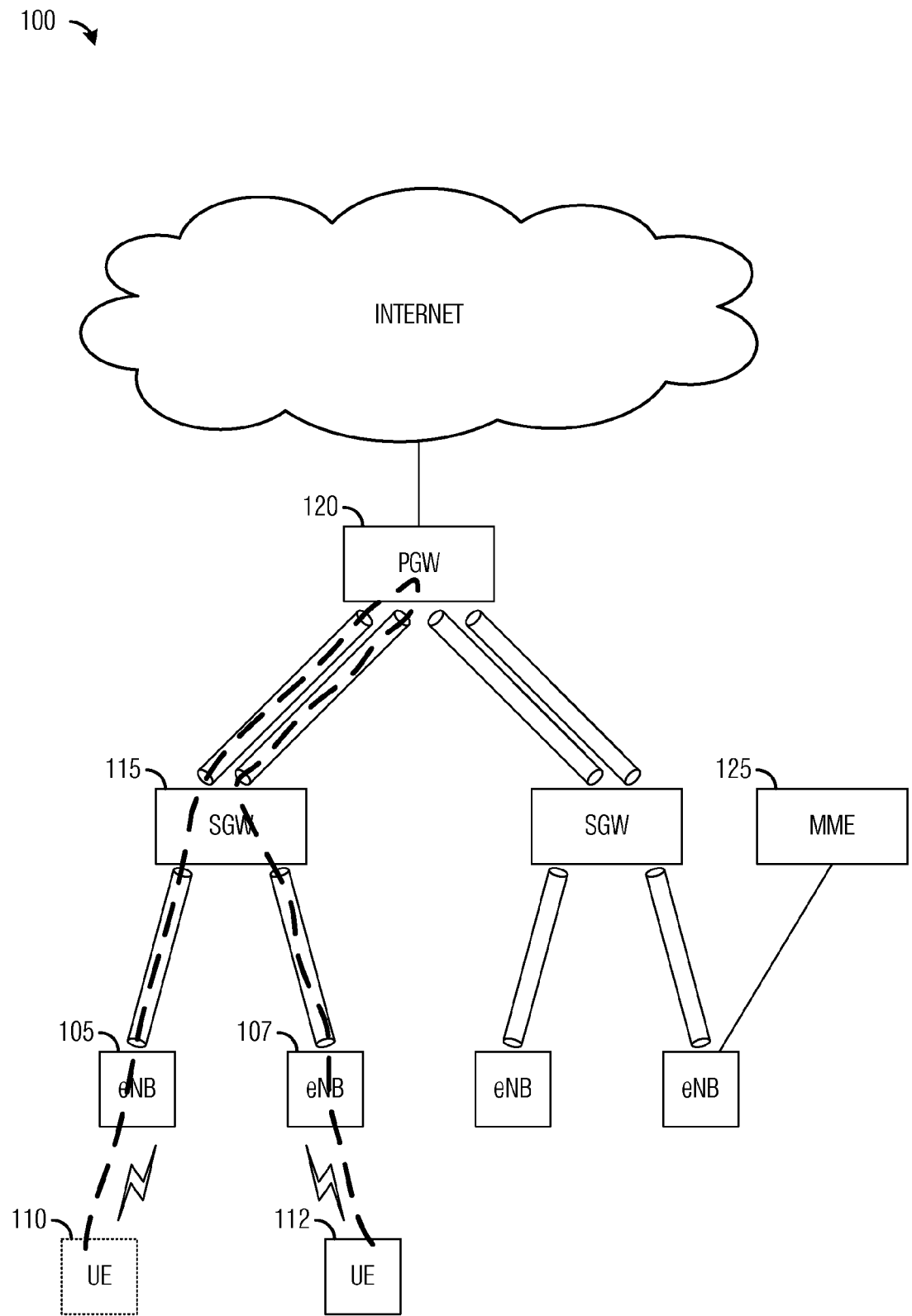
FIG. 1 illustrates an example communications system that uses a centralized entity to manage routing information according to example embodiments described herein.

FIG. 1 illustrates a communications system 100 that uses a centralized entity to manage routing information. Communications system 100 includes a plurality of eNBs, such as eNB 105 and eNB 107. The eNBs serve UEs, such as UE 110 and UE 112, operating their respective coverage areas. Communications system 100 also includes a plurality of serving gateways (SGW), such as SGW 115, which may be used to route and forward packets. Also included in communications system 100 is a packet data network gateway (PGW) 120 that may be used to provide connectivity to external data networks by serving as point of entry and exit for packet traffic. Communications system 100 also includes a mobility management entity (MME) 125 that may be used for UE tracking, i.e., MME 125 is used for mobility management of UEs as they move about communications system 100.

While it is understood that communications systems may employ multiple eNBs capable of communicating with a number of UEs, only four eNBs, two UEs, two SGWs, one PGW, and one MME are illustrated for simplicity.

In communications system 100, when a packet is to be routed to a UE that has changed serving eNBs, the packet may be routed to the PGW 120, which maintains updated routing information for the UEs. At PGW 120, the packet may be routed to the UE. As an example, consider a situation as shown in FIG. 1, wherein UE 112 has moved from an eNB to eNB 107. Then, when UE 110 has a packet to transmit to UE 112, the packet is routed to PGW 120 through tunnels and then routed from PGW 120 to UE 112 through tunnels. It is noted that the routes for packets to other UEs may be substantially similar, independent of their location relative to an originator of the packets.

Figure 2:
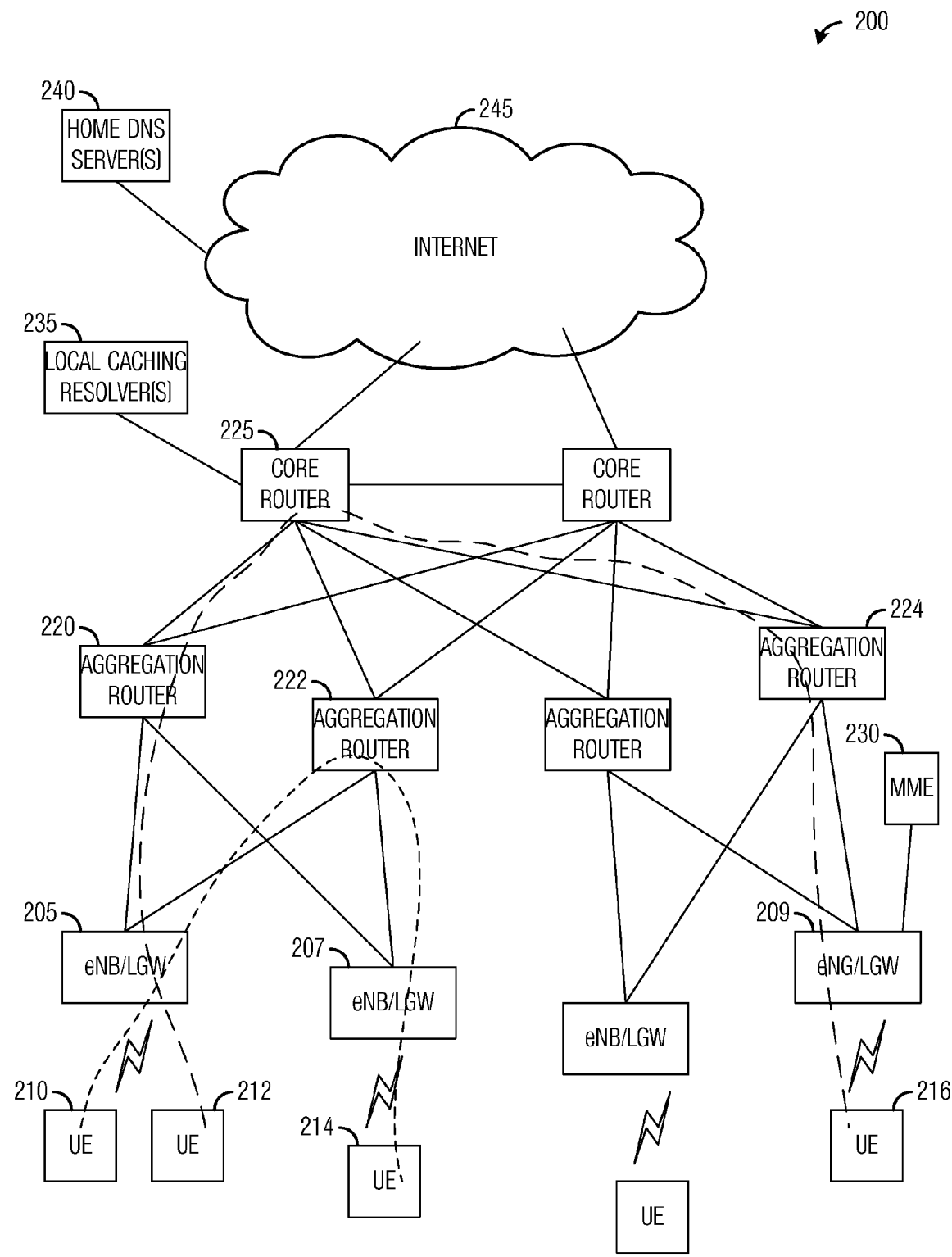
FIG. 2 illustrates an example communications system with mechanisms for managing mobility according to example embodiments described herein.

FIG. 2 illustrates a communications system 200 with mechanisms for managing mobility. The mechanisms in communications system 200 may optimize operations when a UE is capable of changing its address when it performs a handover, as well as when the UE maintains a persistent address for a period of time, even during handovers. Communications system 200 includes a plurality of eNBs, such as eNB 205, eNB 207, and eNB 209. The eNBs serve UEs, such as eNB 205 serving UE 210 and UE 212, eNB 207 serving UE 214, and eNB 209 serving UE 216.

The eNBs include local gateway (LGW) operability, which may include maintaining routing information for local UEs. The LGW operability in the eNBs may be considered to be local routing or a first layer routing. Each eNB may have its own pool of addresses from which it may assign to UEs. The addresses assigned to the UEs may be advertised (e.g., announced) using an interior border gateway protocol (IBGP) or another border gateway protocol (BGP).

At a routing layer higher than the LGW in the eNBs (also referred to as an aggregation router layer), aggregation routers, such as aggregation router 220, aggregation router 222, and aggregation router 224, may be used to manage routing information for pools of addresses of the LGWs of eNBs below the aggregation routers. As an example, aggregation router 220 may manage a first pool of addresses associated with eNB 205 as well as a second pool of addresses associated with eNB 207. Similarly, aggregation router 222 may manage the first pool of addresses associated with eNB 205 as well as the second pool of addresses associated with eNB 207. eNBs having a common aggregation router, such as eNBs 205 and 207, may be referred to as local eNBs. It is noted that although FIG. 2 illustrates a situation wherein aggregation router 220 and aggregation router 222 manage the same pools of addresses, it may be possible that different aggregation routers manage different pools of addresses.

At a routing layer higher than the aggregation routers (also referred to as a core router layer), core routers, such as core router 225, may be used to manage routing information for pools of addresses of the aggregation routers below the core routers. As an example, core router 225 may manage the pools of addresses associated with aggregation router 220, aggregation router 220, and aggregation router 224 (as well as other aggregation routers). It is noted that as shown in FIG. 2, there is redundancy present in the different router layers. As an example, there are two core routers where a single core router may be sufficient. Similarly, there are two aggregation routers where a single aggregation router may be sufficient.

It is also noted that there may be additional layers of routers. As an example, there may be two or more layers of aggregation routers, or two or more layers of core routers. It is also noted that there may be fewer layers of routers. As an example, there may be no aggregation routers. In such a situation, the core routers may take the place of the aggregation routers.

As discussed previously, each eNB may have its own pool of addresses from which it may assign an address to a UE when the UE attaches to the eNB. Ideally, the pool of addresses may be a contiguous block of address space with a common prefix. Each eNB may act as a BGP router and may originate BGP updates for addresses with prefixes that it is associated with. Routers in the aggregation router layer may be configured as route reflectors for the eNBs that they subtend, i.e., the aggregation routers reflect the updated routing information to eNBs below them. In other words, the eNBs may be route reflector clients. The aggregation routers may be configured to aggregate the assigned address prefixes advertised by the eNBs for the core routers above them. Additionally, the aggregation routers may faithfully reflect all sub-prefixes advertised by any route reflector client to all other route reflector clients. Furthermore, any sub-prefixes advertised by a route reflector client that are outside that route reflector client's pre-assigned range (known by configuration in the aggregation router) may also be reflected to the other clients and propagated upward toward the core routers.

Communications system 200 also includes a MME 230 that may be used to manage the mobility of UEs. Additionally, a local caching resolver(s) 235 may be used to assist the core routers to resolve cached address information, such as initial addresses of UEs, routing information, reverse address information, security information, authentication information, and the like. A home domain name system (DNS) server(s) 240 may be used to help resolve addresses, such as Internet Protocol (IP) addresses, from hostnames, and vice versa. It is noted that some entities, such as DNS server(s) 240 may be remotely located, accessible through a network, such as Internet 245.

The UE may or may not retain the assigned address when it handovers onto another eNB. The UE may attach to the eNB in an initial attachment or in a re-attachment. The following describe the operations of a UE and an eNB when the UE attaches to the eNB and obtains an address.

FIG. 3 illustrates a flow diagram of UE operations 300 in obtaining an address. UE operations 300 may be indicative of operations occurring in a UE, such as UE 210, UE 212, UE 214, and UE 216, as the UE obtains an address from an eNB. It is noted that the UE may receive the address upon attachment or re-attachment to the eNB.

UE operations 300 may begin with the UE attaching to the eNB (block 305). The UE may attach to the eNB when it is powered on while in the coverage area of the eNB, when it moves into the coverage area of the eNB without already having attached to another eNB, when it returns to the coverage area of the eNB after leaving for an extended of time and information about the UE have been deleted, and the like.

The UE may then participate in authentication (block 310). The UE may be authenticated in a variety of ways, including a technique based on a symmetric key shared between the UE and a home operator (validated with an authentication, authorization and accounting (AAA) protocol), or a technique based on a public key that is validated with a public key infrastructure (PKI). A detailed description of an example technique for UE authentication is presented below.

It is noted that the technique used for UE authentication may not be critical, as long as the UE is authenticated and that the eNB is able to determine the UE's DNS hostname. The DNS hostname may be bound to a master session key (MSK) shared between the eNB and the UE.

The UE may obtain an address (block 315). As an example, the UE may execute a dynamic host configuration protocol (DHCP) address allocation by transmitting a DHCPDISCOVER message to a DHCP server, which may be located in the eNB. The DHCP may manage the pool of addresses assigned to the eNB. It is noted that since the DHCPDISCOVER is authenticated over the air with the UE's session integrity key, address assignment may be completed without fear of attacks, such as address exhaustion attacks.

The UE may update its address at a DNS server, such as home DNS server 240 (block 320). The UE may install a forward pointer from the hostname of the UE to the assigned address. As an example, the UE may send a dynamic DNS update to the DNS server, with the dynamic DNS update containing the address of the UE. The UE may then be reachable by clients that wish to look up its hostname.

FIG. 4 illustrates a flow diagram of eNB operations 400 in obtaining an address. eNB operations 400 may be indicative of operations occurring in an eNB, such as eNB 205, eNB 207, and eNB 209, as the eNB provides an address to a UE. It is noted that the eNB may provide the address upon the UE's attachment or re-attachment.

eNB operations 400 may begin with the eNB participating in the UE's attaching to the eNB (block 405). The UE may attach to the eNB when it is powered on while in the coverage area of the eNB, when it moves into the coverage area of the eNB without already having attached to another eNB, when it returns to the coverage area of the eNB after leaving for an extended of time and information about the UE have been deleted, and the like.

The eNB may then participate in authentication of the UE (block 410). The UE may be authenticated in a variety of ways, including a technique based on a symmetric key shared between the UE and a home operator (validated with an authentication, authorization and accounting (AAA) protocol), or a technique based on a public key that is validated with a public key infrastructure (PKI). A detailed description of an example technique for UE authentication is presented below.

It is noted that the technique used for UE authentication may not be critical, as long as the UE is authenticated and that the eNB is able to determine the UE's DNS hostname. The DNS hostname may be bound to a master session key (MSK) shared between the eNB and the UE.

The eNB may receive the UE's address (block 415). The eNB may receive the UE's address as a result of the UE performing the dynamic DHCP address allocation. The eNB may update a reverse DNS entry in an in-addr.arpa for IPv4 or ip6.arpa for IPv6 spaces (block 420). As an example, the update reverse DNS entry may point to the UE's authenticated hostname. The eNB may then attest to other entities that the address of the UE has been legitimately assigned to the hostname.

It may be desirable to divert packets at the level of the aggregation routers, i.e., at a level above the eNBs in the communications system. Diverting packets at the level of the aggregation routers may enable implementation without significant modification to the aggregation routers (and above). Additionally, routing information updates may be propagated through the communications system using BGP messaging.

Figure 5:
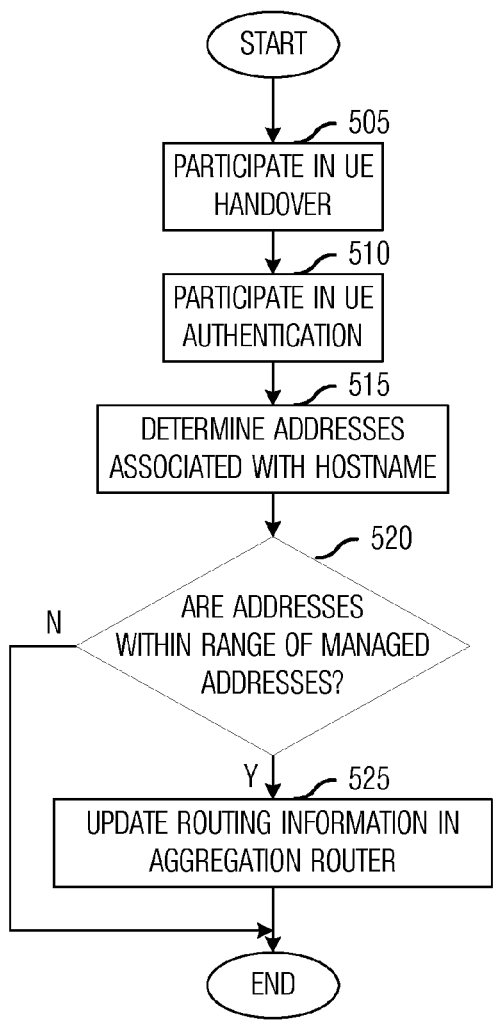
FIG. 5 illustrates an example flow diagram of eNB operations in updating routing information for a UE according to example embodiments described herein.

FIG. 5 illustrates a flow diagram of eNB operations 500 in updating routing information for a UE. eNB operations 500 may be indicative of operations occurring in an eNB, such as eNB 205, eNB 207, and eNB 209, as the eNB updates routing information for a UE after the UE handovers to the eNB.

eNB operations 500 may begin with the eNB participating in a handover with the UE (block 505). Typically, in a handover, the UE switches from being served by a source eNB to being served by a target eNB (i.e., the eNB). The eNB may participate in UE authentication to verify the identity of the UE (block 510). A detailed description of an example UE authentication is presented below.

As part of the authentication process, the eNB may obtain the UE's authenticated hostname. The eNB may determine the original address(es) of the UE from the authenticated hostname (block 515). As an example, the eNB may use a lookup with the authenticated hostname to obtain the original address(es), e.g., IP addresses, of the UE. As an example, the eNB may perform a reverse lookup in the in-addr.arpa or ip6.arpa space (this space is typically controlled by the wireless ISP, unlike the forward mapping which is controlled by the UE) for each such original address to ensure that some peer eNB in its autonomous system, i.e., communications system, did actually assign the original address to the given hostname of the UE.

The eNB may perform a check to determine if the original address(es) of the UE are within a range of managed addresses that are managed by BGP in an autonomous system (block 520). In other words, the eNB may check to determine if the original address(es) of the UE was assigned by an eNB that is part of the communications system that includes the eNB. If the original address(es) of the UE is not within the range of managed addresses that are managed by BGP in the autonomous system, then a routing information update using BGP may be unlikely to reach a different autonomous system that includes an eNB that assigned the original address(es) of the UE. It is noted that the autonomous system may also be referred to as a communications system, which may be considered to be an access network. As an example, the eNB may determine if the original address(es) is within the range of managed addresses if a prefix of the original address(es) is one of one or more managed address prefixes of the range of managed addresses.

If the original address(es) lies within the range of managed addresses of the autonomous system, the eNB may update routing information for the UE at an aggregation router(s) associated with the eNB (block 525). In other words, the eNB may send the updated routing information to aggregation routers immediately above it, i.e., its parent aggregation router(s). It is noted that the eNB may have more than one parent aggregation router, such as shown in FIG. 2 where each eNB has two parent aggregation routers. As an example, the eNB may update its peers containing Network Layer Reachability Information (NLRI) of the specific prefix (perhaps just a single address) that was assigned to the UE by sending a BGP message, such as a BGP UPDATE message, to the aggregation router(s) in the aggregation router layer above the eNB. The BGP message may include information about the eNB. The BGP message may include the eNB as the next hop (the NEXT_HOP attribute) for the UE, i.e., indicating that the eNB is serving as a border router for the UE. As another example, the eNB may also set a LOCAL_PREF attribute to a timestamp derived from its local clock, which may ensure that updated routing information may be preferred over previously advertised routing information by the eNB or another eNB.

Figure 6:
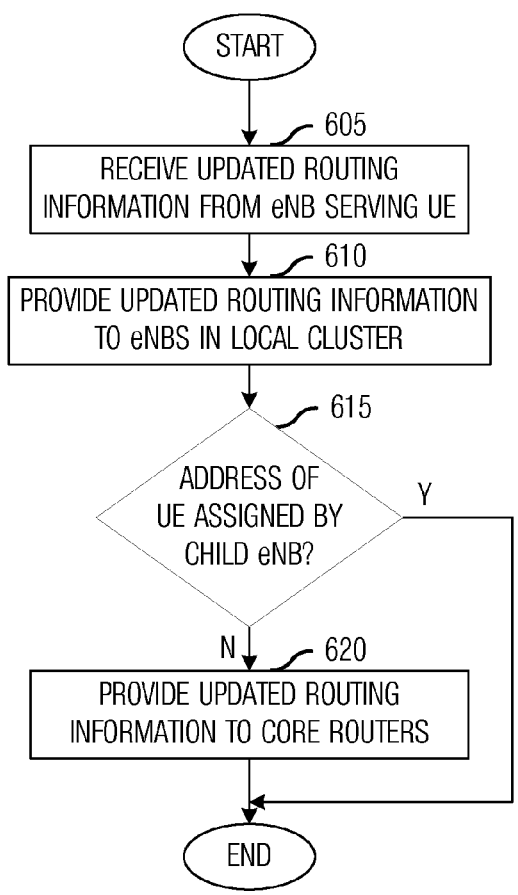
FIG. 6 illustrates an example flow diagram of aggregation router operations in updating routing information for a UE according to example embodiments described herein.

FIG. 6 illustrates a flow diagram of aggregation router operations 600 in updating routing information for a UE. Aggregation router operations 600 may be indicative of operations in an aggregation router, such as aggregation router 220, aggregation router 222, and aggregation router 224, as the aggregation router updates routing information for the UE.

Aggregation router operations 600 may begin with the aggregation router receiving updated routing information from an eNB that is serving a UE that has performed a handover to the eNB (block 605). As an example, the aggregation router may receive a BGP message, such as a BGP UPDATE message, from the eNB. The BGP message may include the eNB as the next hop for the UE. The BGP message may also include a timestamp to help ensure that the updated routing information takes precedence over previously advertised routing information for the UE from the eNB or another eNB.

The aggregation router may provide the updated routing information to other eNBs that are also in the local cluster with the eNB that is serving the UE (block 610). The eNBs that are also in the local cluster with the eNB may be referred to as local eNBs, which also includes the eNB that is serving the UE. In other words, the aggregation router may serve as a routing information reflector to provide the updated routing information to the local eNBs that are in a local cluster that includes the eNB that is serving the UE.

The aggregation router may perform a check to determine if an original address of the UE (assigned by an original eNB to which the UE initially attached) was assigned by one of the local eNBs (block 615). In other words, the aggregation router may check to determine if a prefix of the original address of the UE was assigned by an original eNB that is in the same local cluster as that of the eNB that is serving the UE. If the original address of the UE was assigned by the original eNB that is in the same local cluster as that of the eNB that is serving the UE, then the aggregation router may not need to further propagate the updated routing information.

If the original address of the UE was assigned by the original eNB that is not in the same local cluster as that of the eNB that is serving the UE, then the aggregation router may provide the updated routing information to a core router(s) associated with the aggregation router (block 620). In other words, the aggregation router may send the updated routing information to a core router(s) immediately above it, i.e., its parent core router(s). It is noted that the aggregation router may have more than one parent core router. As an example, the aggregation router may send a BGP message, such as a BGP UPDATE message, to the core router(s) in the core router layer above the aggregation router. The core router(s) may reflect the updated routing information to other routers and/or eNBs in the communications system.

Figure 7:
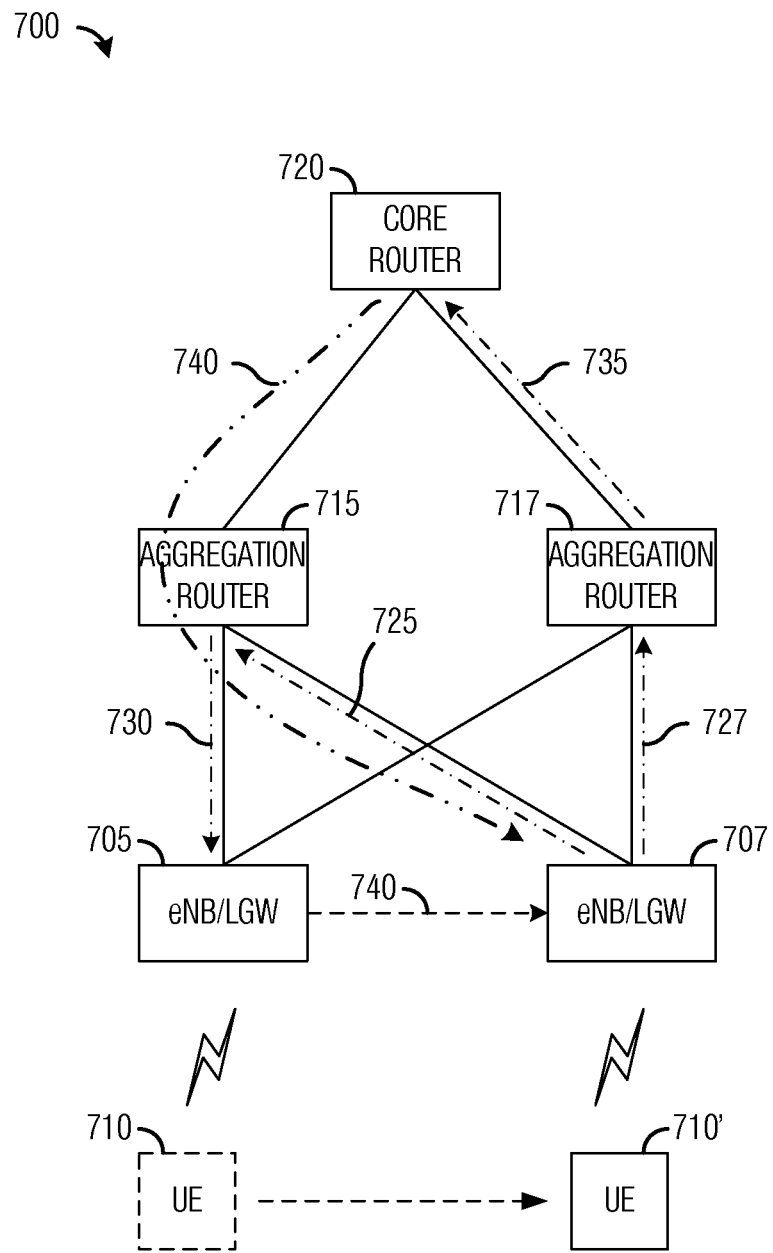
FIG. 7 illustrates an example portion of a communications system, where a propagation of updated routing information is highlighted according to example embodiments described herein.

FIG. 7 illustrates a portion of a communications system 700, where a propagation of updated routing information is highlighted. Communications system 700 includes an eNB 705 and an eNB 707. A UE 710, initially served by eNB 705 moves to eNB 707. As shown in FIG. 7, UE 710 when served by eNB 707 is denoted UE 710' to prevent confusion. In an aggregation router layer, communications system 700 includes aggregation router 715 and aggregation router 717. Aggregation router 715 may be parent to eNB 705 and eNB 707. Similarly, aggregation router 715 may be parent to eNB 705 and eNB 707. In a core router layer, communications system 700 includes core router 720. Core router 720 may be parent to aggregation router 715 and aggregation router 717.

As a result of UE 710 changing from eNB 705 to eNB 707, eNB 707 may send a routing information update to aggregation router 715 (shown as dashed-dotted line 725) and aggregation router 717 (shown as dashed-dotted line 727). Aggregation router 715 may reflect the routing information update to eNB 705 (shown as dashed-dotted line 730). It is noted that aggregation router 717 may also reflect the routing information update to eNB 705.

If the original address of UE 710' is not local to that of a local cluster of eNBs including eNB 707, then aggregation router 717 may send the routing information update to core router 720 (shown as dashed-dotted line 735). It is noted that aggregation router 715 may also send the routing information update to core router 720. Core router 720 may make a BGP policy decision and route packets to UE 710' in a direct path through eNB 707 (shown as dashed-double dotted line 740). It is noted that a direct routing path between eNB 705 and eNB 707, e.g., dashed line 740, may be used if available.

Therefore, when the UE moves within a single local cluster, the updated routing information may be confined to that single local cluster. However, when the UE crosses a local cluster boundary, the updated routing information may be propagated through the entire communications system. The propagation of the update routing information may help to ensure that optimal routes are used everywhere in the communications system.

In general, there may be additional peer-to-peer links in the communications system. As an example, there may be links directly between neighboring eNBs. Such links may appear in an interior gateway protocol (IGP), such as open shortest path first (OSPF), enhanced interior gateway routing protocol (EIGRP), intermediate system to intermediate system (IS-IS), and the like. However, the links may not appear in BGP since route reflection takes care of propagating BGP prefixes.

The techniques presented herein permit packets to utilize the routing information when appropriate. As an example, a packet originating at a first eNB that is destined for an address that originally was also located at the first eNB but temporarily has moved to a second eNB may match a more specific route to the second eNB listed as a NEXT_HOP in BGP and recursive routing may forward the packet over a direct link.

Therefore, the UE may retain its address throughout the communications system if it wishes. When the address is nearing its lease expiration, the UE may send a request, such as a unicast DHCPREQUEST, to the original eNB to renew the lease. The eNBs in the communications system may need to filter packets bound to addresses internal to the communications system to prevent abuse. In the case of the request, such as the DHCPREQUEST, going to a remote eNB, a current base station of the UE may need to add a DHCP Relay Agent Information Option containing the UE's DNS hostname in an Agent Remote ID sub-option.

Maintaining an address for an extended period of mobility may be sub-optimal due to the large amount of routing state that would be introduced. The techniques presented herein may be optimized for a situation where the UE can periodically change its address to one that is more locally-appropriate. The BGP routing information updates can provide a micro-mobility solution that hides the UE's movement from entities outside the communications system and may avoid frequent updates of its home DNS server. However, UEs may keep track of which connections are using which addresses, and can periodically obtain new addresses from whatever eNB to which they happen to be attached. Each address currently assigned to the UE may be registered to its home DNS server, with the most recently allocated listed first, for example. Clients may therefore prefer the most recently allocated address for new connections.

Publishing the address assigned to a UE has security implications. Anyone who does a lookup can track the UE to the eNB to which it was attached when it reserved the address. In general the use of an optimal route seems to be at odds with location privacy; if the UE needs location privacy, it should hide itself behind a proxy and only publish the proxy's IP address to the public DNS. An embodiment can function with pseudonyms assigned to UEs by the visited eNB.

When a UE wants to release an address it should remove it from its home DNS server and send a message, such as a DHCPRELEASE, to the original eNB. An eNB may have a policy that limits the number of times an address assignment may be renewed from a remote eNB. This may force the UE to eventually release the address, and thereby allowing for the optimization of the routing tables.

The prefixes injected into the BGP may likely be full-length IPv4 addresses, although for IPv6 assignment of prefixes would be more appropriate. eNBs in a communications system may need to agree on the prefix lengths they are assigning, and these prefixes may need to be on byte boundaries (for in-addr.arpa reverse lookups) or nybble boundaries (for ip6.arpa reverse lookups). The target eNB may look up the UE's hostname and get back a single address(es) that is drawn from the prefixes and then perform a reverse lookup on the containing prefix. Long prefixes are generally unsuitable for entry into the global routing table; however, it may be possible in some cases for two neighboring communications systems to agree to allow routes from each other over EBGP. The two communications systems may need to be careful that all of their eNBs clocks were synchronized and were properly filtering the remote DHCPREQUEST messages to add the Agent Remote ID sub-option. Service providers should charge appropriately for remote renewals of an IP address due to the large strain it puts on the routing infrastructure. The charging may encourage UEs to get fresh local addresses when they are able.

Figure 8:
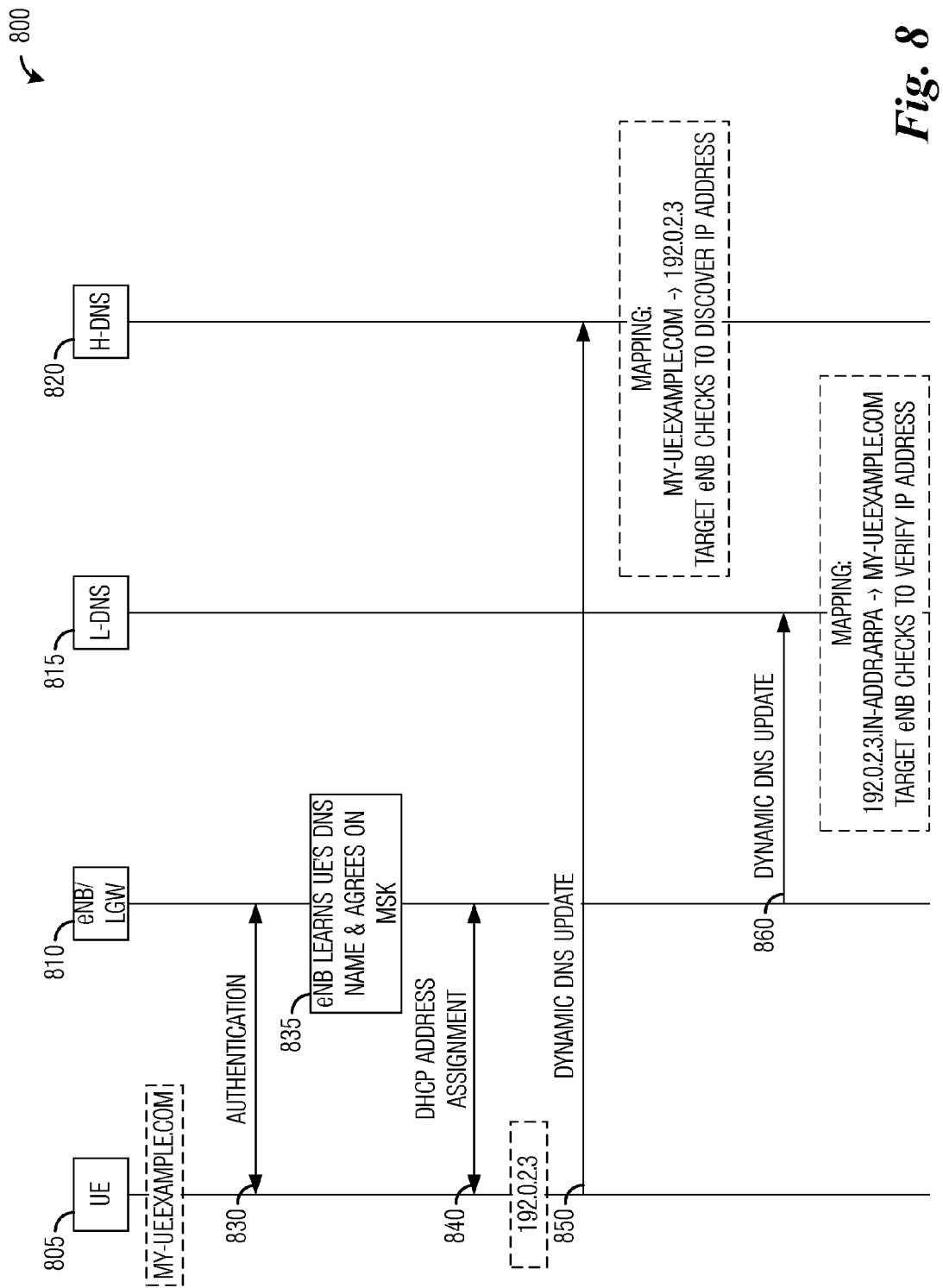
FIG. 8 illustrates an example message exchange diagram highlighting messages exchanged in an updating of addresses according to example embodiments described herein.

FIG. 8 illustrates a message exchange diagram 800 highlighting messages exchanged in an updating of addresses. Message exchange diagram 800 includes messages exchanged between a UE 805, an eNB 810, a local DNS (L-DNS) 815, and a home DNS (H-DNS) 820. For discussion purposes, consider a situation wherein UE 805 has a hostname "MY-UEEXAMPLE.COM". When UE 805 attaches (or handovers onto) eNB 810, eNB 810 authenticates UE 805 (shown as event 830). A result of the authentication of UE 805 may be that eNB 810 learns the DNS name (e.g., the hostname) of UE 805. Additionally, eNB 810 and UE 805 agree on a master session key (MSK) (block 83).

After authentication, UE 805 obtains an address, i.e., an IP address, by requesting an address assignment from eNB 840 using a DHCP address assignment, for example (shown as event 840). For discussion purposes, let the address of UE 805 be 192.0.2.3. With its assigned address, UE 805 may perform a dynamic DNS update with H-DNS 820 to update a mapping of its hostname to its address (shown as event 850). As shown in FIG. 8, after the dynamic DNS update, the hostname of UE 805 (MY-UEEXAMPLE.COM) now maps to the address of UE 805 (192.0.2.3). Entities in the communications system may check the hostname of UE 805 to determine its address.

In addition to UE 805 performing the dynamic DNS update to update the mapping of its hostname to its address, eNB 810 may perform a dynamic DNS update with L-DNS 815 to update a reverse mapping of the address of UE 805 to the hostname of UE 805 (shown as event 860). As shown in FIG. 8, after the dynamic DNS update, the address of UE 805 (192.0.2.3) reverse maps to the hostname of UE 805 (MY-UEEXAMPLE.COM). Entities in the communications system may check the address of UE 805 to determine its hostname.

As discussed previously, upon a handover within a communications system, the UE may be authenticated by the target eNB. Generally, an authentication protocol is executed every time that a UE encounters a new eNB. Therefore, there is a desire to reduce the costs (e.g., computational costs, communications costs, and the like) involved in executing the authentication protocol. An example authentication technique uses public key cryptography, such as an Elliptic Curve Diffie-Hellman exchange between the UE and the eNB, to authenticate the UE.

Figure 9:
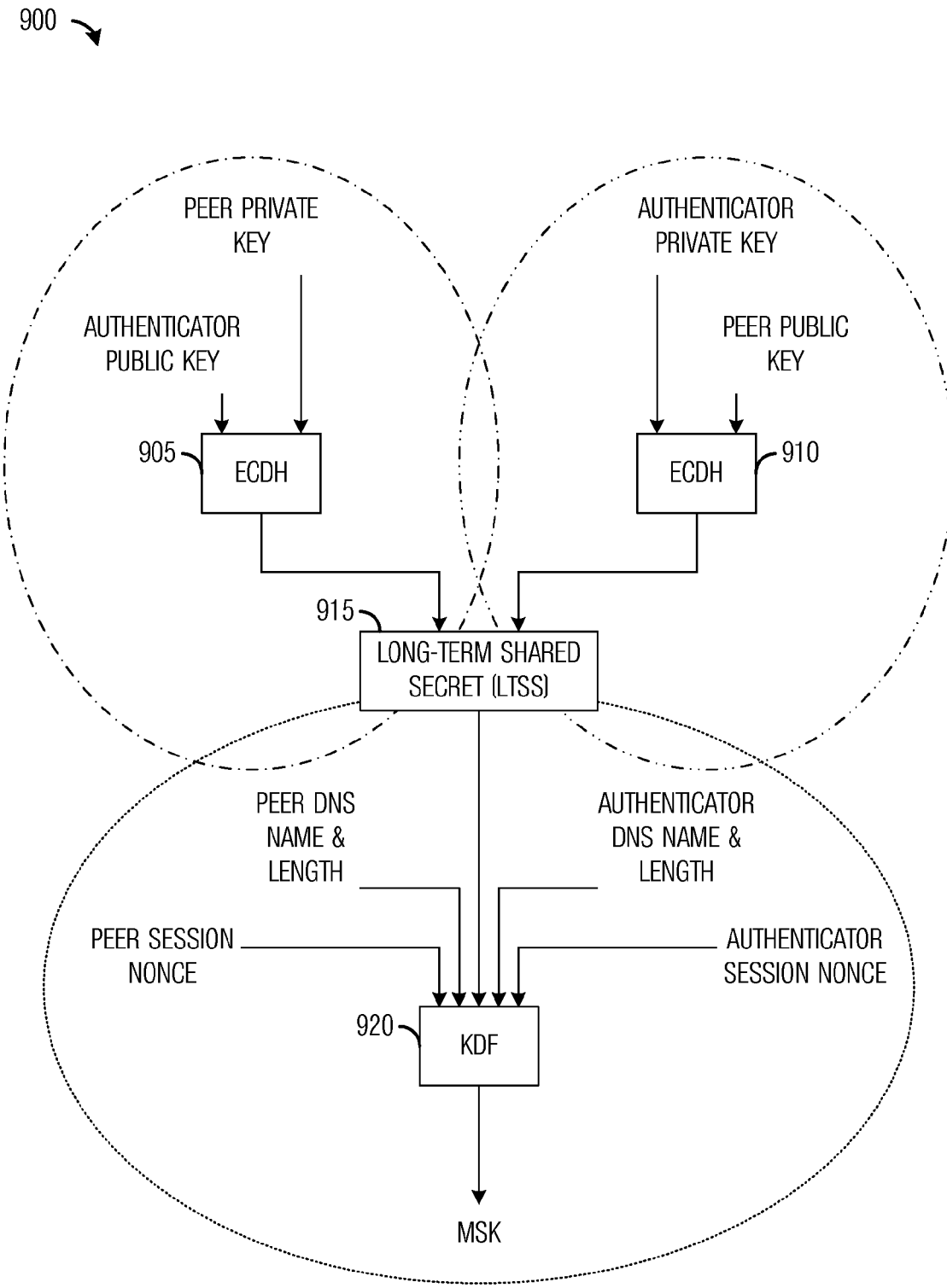
FIG. 9 illustrates an example flow diagram of operations in a peer and an authenticator as they participate in peer authentication according to example embodiments described herein.

FIG. 9 illustrates a flow diagram of operations 900 in a peer and an authenticator as they participate in peer authentication. As used in the discussion herein, the terminology of "peer" and "authenticator" are used as they are used in the Extensible Authentication Protocol (EAP). As an example, the peer is the UE and the authenticator is the eNB or a Home Agent. It is noted that a Home Agent may be a router or some other device that intercepts packets destined to a UE's address and redirects the packets through a tunnel to the UE's current point of attachment. Assume that the peer and authenticator are both named entities with DNS records containing the public portion of their keys. All such DNS records generally are protected with Domain Name System Security Extensions (DNSSEC).

The peer and the authenticator may discover each other's names and obtain the public keys corresponding to those names. The names and public keys for a device, such as a peer and/or an authenticator, may be referred to as device information. There may be several different techniques that may be used by the peer to learn the authenticator's name and public key. They include:

(1) The authenticator broadcasts its name and public key in system overhead messages.

(2) The authenticator unicasts its name and public key to the peer in an LTE Non-Access Stratum (NAS) message.

(3) The authenticator inserts its name and public key in the readable string portion of an EAP Identity Request and/or after the null terminating character.

(4) The peer learns the DNS name of the authenticator and looks up the authenticator's key in the DNS using DNSSEC over an existing connection to the Internet prior to attaching to the authenticator.

In the techniques (1)-(3), the peer may obtain assurance that the public key belongs to the name of the authenticator by making a DNS query of the name as its first action upon obtaining Internet access through the authenticator.

The authenticator may learn the name of the peer as part of the handover process. The authenticator may learn the public key of the peer by accessing the DNS records, for example. Since the peer is handed over from a trusted device (e.g., another eNB or another Home Agent), the authenticator may trust the name of the peer.

As an example, the actual authentication process comprises a single message sent from the peer to the authenticator. The message can be embedded in a NAS message or an EAP Identity Response message destined to the authenticator, for example. Upon receiving and validating the message, the authenticator may be able to derive a Master Session Key (MSK) that will be securely bound to the pair of DNS names given by the peer and the authenticator. The message from the peer to the authenticator may be protected with a Hash-based Message Authentication Code (HMAC) using the MSK derived by the peer, for example. Upon validating the authentication message, and if requested by the peer, the authenticator may begin the mobility management process discussed previously.

The authenticator may in parallel send a NAS message or an EAP Success message indicating successful authentication. The NAS message may be a Security Mode Command message that initializes the over-the-air integrity protection and encryption, for example. The EAP Success message may also trigger a lower layer key handshake, as specified by IEEE 802.11i, for example.

As shown in FIG. 9, the peer and the authenticator are shown independently (highlighted in separate dashed ovals) performing Elliptic Curve Cofactor Diffie-Hellman (ECDH) (blocks 905 and 910, respectively). The peer may use its own private key and the public key of the authenticator, and the authenticator may use its own private key and the public key of the peer. Although the ECDH performed by the peer and the authenticator may be different, both the peer and the authenticator arrive at the same value, which may be used as long-term shared secret (LTSS) 915. The LTSS may be cached so that the computationally expensive ECDH operation does not need to be repeated when the peer accesses the authenticator in the future.

The MSK may be derived using a key derivation function (KDF) 920. KDF 920 may have as input the LTSS, identities of the peer and the authenticator (e.g., the DNS names and their lengths), as well as session nonces from the peer and the authenticator. It is noted that the derivation of the MSK (i.e., shown in the dashed oval) may be performed in the peer and/or the authenticator. KDF 920 may also include a counter value (set initially to 1, for example) and a unique string that indicates which function is initiating KDF 920. Thereby making the key derivation compliant to Section 5.8.1 of NIST SP 800-56A.

It is noted that the authenticator may send a session nonce along with its public key in any of the four techniques discussed above. It is also noted that in the case of publication in the DNS, the authenticator's session nonce may actually be re-used by incoming sessions for a period of time. Session MSKs are still independent due to the entropy added by the peer in its own session nonce and by the different LTSSs derived for different peers however.

If in certain scenarios it is unacceptable to use the authenticator's nonce for more than one session, an authenticator session nonce may be placed into the response to the peer's single authentication message. The response triggers both sides to re-compute the MSK and to use it going forward. The response message may be authenticated with an HMAC using a key derived from either the first or second MSK to avoid denial-of-service attacks. An example includes such a "re-MSK" message available to either side during the life of the session to enable re-freshing of the MSK.

The derivation of the LTSS and the execution of KDF 920 to generate the MSK generally may be carried out in a secure environment, and both private keys and the LTSS may be stored in the secure environment so that they cannot be accessed except by the authentication process. The MSK may also be kept in the secure environment, with an interface provided to derive further keys from it. Alternatively, the MSK may be distributed to the outside environment for subsequent use. Historically, the secure environment has been implemented inside tamper-proof hardware that is resistant to duplication (e.g., "cloning"). Such hardware usually runs at a much lower clock speed than the general purpose CPU that is used for other computing tasks. Because the ECDH operation generally uses the support of the main CPU, hardware virtualization support on the main CPU can be used to create a secure environment for the generation, storage, and use of private keys and the LTSS.

FIG. 10 illustrates a flow diagram of operations 1000 occurring in a peer as it participates in an authentication process with an authenticator. Operations 1000 may be indicative of operations occurring in a peer, such as a UE, as the peer participates in an authentication process with an authenticator.

Operations 1000 may begin with the peer obtaining authenticator information (block 1005). The authenticator information obtained by the peer may include the authenticator's name and the authenticator's public key. The peer may use ECDH to generate a LTSS, which may be cached for later use (block 1010). The LTSS, along with the peer information (e.g., peer DNS name and length), peer nonce, authenticator information (e.g., authenticator DNS name and length), and authenticator nonce, may be used to derive a MSK (block 1015).

The peer may initiate the authentication process (block 1020). As an example, the peer may initiate the authentication process by sending a message, such as a NAS message or an EAP Identity Response message. The peer may then receive an authentication validate response message from the authenticator (block 1025). The validate response message may indicate that the authenticator validated the peer.

FIG. 11 illustrates a flow diagram of operations 1100 occurring in an authenticator as it participates in an authentication process with a peer. Operations 1100 may be indicative of operations occurring in an authenticator, such as an eNB or a Home Agent, as the authenticator participates in an authentication process with a peer.

Operations 1100 may begin the authenticator receiving a message initiating the authentication process (block 1105). As an example, the message may be a NAS message or an EAP Identity Response message. The authenticator may obtain peer information (block 1110). As an example, the peer information may include the peer's name and the peer's public key.

The authenticator may use ECDH to generate a LTSS, which may be cached for later use (block 1115). The LTSS, along with the peer information (e.g., peer DNS name and length), peer nonce, authenticator information (e.g., authenticator DNS name and length), and authenticator nonce, may be used to derive a MSK (block 1120). The authenticator may use the MSK to validate the message from the peer (block 1125) and send a validate response to the peer (block 1130).

As described above, the completion of the authentication process indicates to the eNB that the UE is authentic and that its traffic should be redirected to the new point of attachment. Upon initial attachment, the UE doesn't have any assigned address and may obtain one using DHCP. At the same time, the DHCP server assigns the name of a Home Agent that may be used by the UE when it leaves the area inside which a BGP UPDATE accomplishes the traffic re-routing for the given address. The Home Agent may be strategically placed at the boundary of this region, introducing the least amount of latency once the UE puts it on the forwarding path. The UE can perform a DNS lookup on the Home Agent name to retrieve the Home Agent's public key and perform the derivation of an LTSS long in advance of needing the Home Agent's services. Messages can be provided so that the UE and the Home Agent can develop an MSK without the Home Agent sending a BGP UPDATE. Therefore, the need to derive an MSK later when the Registration Request/Binding Update is actually sent may be avoided.

An example provides a way of indicating to the UE whether or not its old address(es) have been successfully re-routed or whether it needs to perform a Mobile IP Registration Request/Binding Update to receive its traffic. One way may be to wait for the eNB to send a Router Advertisement (RA). The eNB generally contains those prefixes that were successfully re-routed by the eNB sending a BGP UPDATE. If any prefix is missing from this list, the UE may initiate the Mobile IP Registration and/or Binding Update for those that are missing. In some situations this may result in too much overhead, in which case it may be desirable to build in some indication at the link layer (e.g., NAS signaling) when some prefixes were not able to be re-routed.

Existing 3GPP Long Term Evolution (LTE) compliant networks enable the UEs to remain in an idle state for many mobility events. The idle states may be accomplished through the use of Tracking Area Lists, and the UE may not need to update its location as long as it is within a Tracking Area that is on the list it was last sent. Embodiments support this concept. Packets destined to the mobile node are always routed to the eNB on which it was last authenticated. The eNB may page the UE throughout the Tracking Area List that it previously sent to the UE, and the UE attaches to the currently serving eNB and carry out authentication to obtain these packets. The BGP UPDATE would reach the old eNB, which may then forward the packets as normal. The Tracking Area Lists are generally chosen to make a proper tradeoff between the frequency of re-authentication and the size of the paging areas, keeping in mind that the UE may re-authenticate itself to receive packets at the current location.

Caching of the LTSSs improves the performance of various techniques. Each UE may retain the LTSS for many if not all of the eNBs that it has previously visited, and the eNBs may retain the LTSS for many of the recently seen UEs. Caching may make the derivation of the MSK a simple matter of exchanging nonces and running the KDF process.

Figure 12:
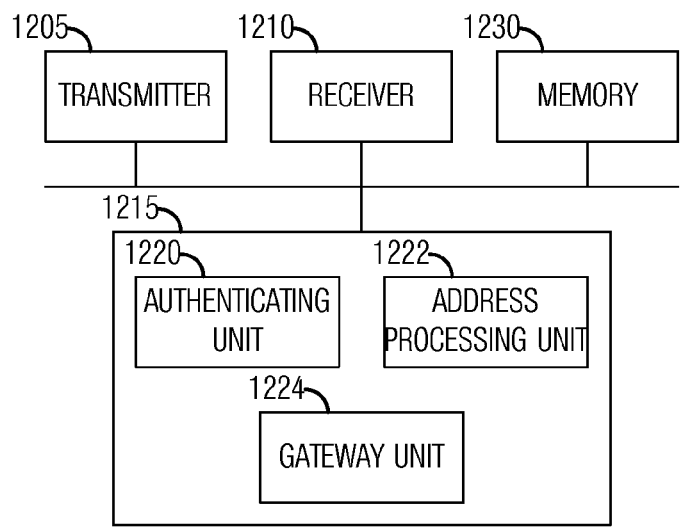
FIG. 12 illustrates an example first communications device according to example embodiments described herein.

FIG. 12 illustrates a diagram of a first communications device 1200. Communications device 1200 may be an implementation of an eNB of a communications system. Communications device 1200 may be used to implement various ones of the embodiments discussed herein. As shown in FIG. 12, a transmitter 1205 is configured to send messages, routing information, DNS updates, and the like, and a receiver 1210 is configured to receive messages, routing information, and the like. Transmitter 1205 and receiver 1210 may have a wireless interface, a wireline interface, or a combination thereof.

An authenticating unit 1220 is configured to authenticate a device, such as a peer, a UE, and the like, after the device attaches or handovers to communications device 1200. Authenticating unit 1220 may make use of an authentication process, such as the single message authentication process using ECDH as described herein. An address processing unit 1222 is configured to assign addresses to devices, look up addresses, reverse look up addresses, update addresses, determine an address of a device, determine if an address (or a prefix) is a local address (or a local prefix), and the like. Address processing unit 1222 is configured to determine routing information as well as routing information updates. A gateway unit 1224 is configured to provide an entry and/or an exit for a local portion of a communications system. Gateway unit 1224 is configured to provide entry and/or exit for UE served by communications device 1200. A memory 1230 is configured to store addresses, routing information, updates for routing information, public keys, private keys, nonces, and the like.

The elements of communications device 1200 may be implemented as specific hardware logic blocks. In an alternative, the elements of communications device 1200 may be implemented as software executing in a processor, controller, application specific integrated circuit, or so on. In yet another alternative, the elements of communications device 1200 may be implemented as a combination of software and/or hardware.

As an example, transmitter 1205 and receiver 1210 may be implemented as a specific hardware block, while authenticating unit 1220, address processing unit 1222, and gateway unit 1224 may be software modules executing in a processor 1215, such as a microprocessor, a digital signal processor, a custom circuit, or a custom compiled logic array of a field programmable logic array.

Figure 13:
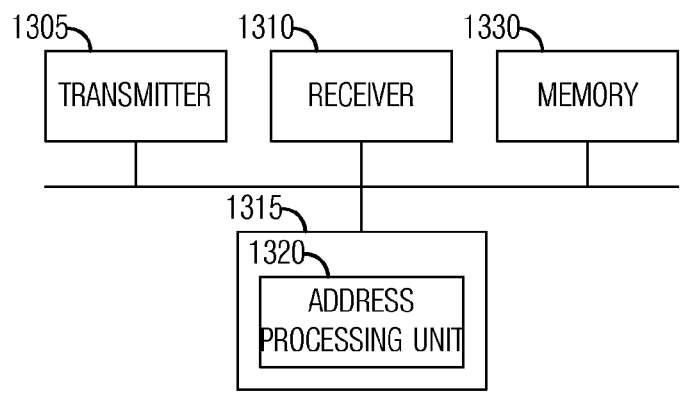
FIG. 13 illustrates an example second communications device according to example embodiments described herein.

FIG. 13 illustrates a diagram of a second communications device 1300. Communications device 1300 may be an implementation of an aggregation router of a communications system. Communications device 1300 may be used to implement various ones of the embodiments discussed herein. As shown in FIG. 13, a transmitter 1305 is configured to send messages, routing information, and the like, and a receiver 1310 is configured to receive messages, routing information, and the like. Transmitter 1305 and receiver 1310 may have a wireless interface, a wireline interface, or a combination thereof.

An address processing unit 1320 is configured to assign addresses to devices, look up addresses, reverse look up addresses, update addresses, determine an address of a device, determine if an address (or a prefix) is a local address (or a local prefix), and the like. Address processing unit 1320 is configured to determine routing information as well as routing information updates. A memory 1330 is configured to store addresses, routing information, updates for routing information, and the like.

The elements of communications device 1300 may be implemented as specific hardware logic blocks. In an alternative, the elements of communications device 1300 may be implemented as software executing in a processor, controller, application specific integrated circuit, or so on. In yet another alternative, the elements of communications device 1300 may be implemented as a combination of software and/or hardware.

As an example, transmitter 1305 and receiver 1310 may be implemented as a specific hardware block, while address processing unit 1320 may be software modules executing in a processor 1315, such as a microprocessor, a digital signal processor, a custom circuit, or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method for maintaining routing information for a wireless device, the method comprising:
   authenticating the wireless device, including:
   determining wireless device information, including receiving a wireless device name, a wireless device name length, and a wireless device public key;
   generating a shared secret in accordance with the wireless device name and the wireless device public key;
   deriving a session key using the wireless device information;
   validating an authentication initiating message from the wireless device using the session key; and
   transmitting an authentication initiating response;
   determining, by a target communications controller, an original address of the wireless device handed over from a source communications controller, wherein the original address is assigned by an original communications controller; and
   updating, by the target communications controller, routing information associated with the wireless device using a border gateway protocol message if the original address lies within a range of addresses managed by a communications system including the target communications controller and an aggregation router, wherein the routing information is stored at the aggregation router.

2. The method of claim 1, further comprising authenticating the wireless device using public key cryptography.

3. The method of claim 1, further comprising deriving the session key using information comprising a target communications controller name, a target communications controller name length, a target communications controller nonce, the wireless device name, the wireless device name length, a wireless device nonce, and the shared secret.

4. The method of claim 1, wherein the border gateway protocol message comprises a border gateway protocol update message.

5. The method of claim 4, wherein the border gateway protocol update message comprises a next hop attribute set to an address of the target communications controller.

6. The method of claim 4, wherein the border gateway protocol update message comprises a timestamp.

7. The method of claim 1, further comprising performing a lookup with a hostname of the wireless device to obtain the original address of the wireless device.

8. The method of claim 7, further comprising performing a reverse lookup with the original address of the wireless device in one of an IPv4 domain space and an IPv6 domain space.

9. The method of claim 1, wherein the original address comprises an Internet Protocol address.

10. The method of claim 1, wherein the original address lies within the range of addresses managed by the communications system if the communications system includes the original communications controller.

11. A target communications controller comprising:
   a receiver configured to receive wireless device information including a wireless device name, a wireless device name length, and a wireless device public key for a wireless device;
   a hardware processor coupled to the receiver and configured to:
   authenticate the wireless device, including the processor configured to:
   generate a shared secret in accordance with the wireless device name and the wireless device public key;
   derive a session key using the wireless device information;
   validate an authentication initiating message from the wireless device using the session key; and
   transmit an authentication initiating response;
   determine an original address of the wireless device handed over from a source communications controller, wherein the original address is assigned by an original communications controller; and
   update routing information associated with the wireless device using a border gateway protocol message if the original address lies within a range of addresses managed by a communications system including the target communications controller and an aggregation router, wherein the routing information is stored at the aggregation router.

12. The target communications controller of claim 11, wherein the processor is configured to authenticate the wireless device using public key cryptography.

13. The target communications controller of claim 11, wherein the processor is configured to derive the session key using information comprising a target communications controller name, a target communications controller name length, a target communications controller nonce, the wireless device name, the wireless device name length, a wireless device nonce, and the shared secret.

14. The target communications controller of claim 11, wherein the border gateway protocol message comprises a border gateway protocol update message.

15. The target communications controller of claim 11, wherein the processor is configured to perform a lookup with a hostname of the wireless device to obtain the original address of the wireless device.

* * * * *